July 7, 1959
E. E. SHELDON
2,894,159
ELECTRONIC SYSTEM FOR X-RAY IMAGES
Filed June 1, 1951
2 Sheets-Sheet 1
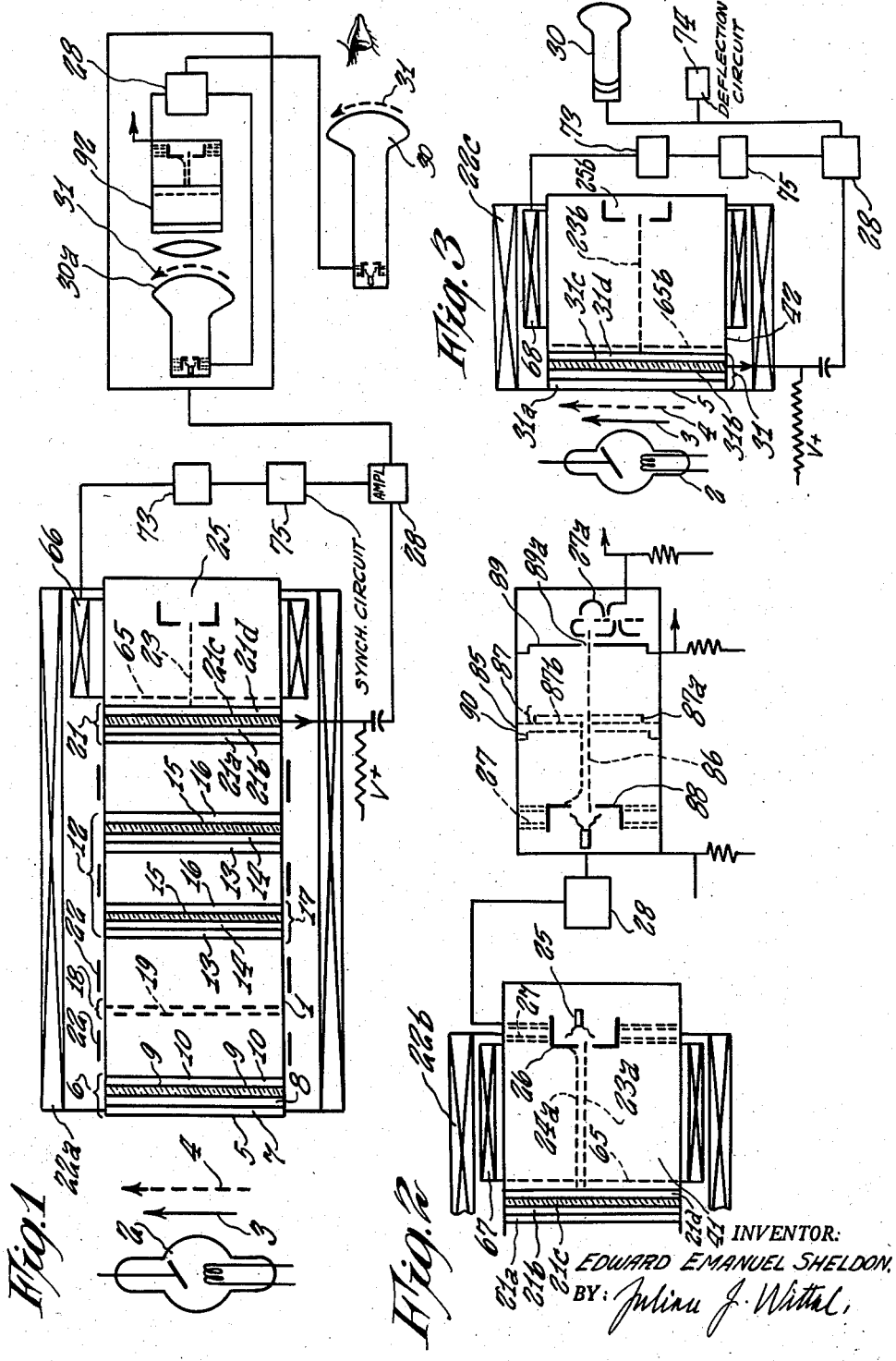
INVENTOR:
EDWARD EMANUEL SHELDON,
BY: Julian J. Wittal,
HIS ATTORNEY

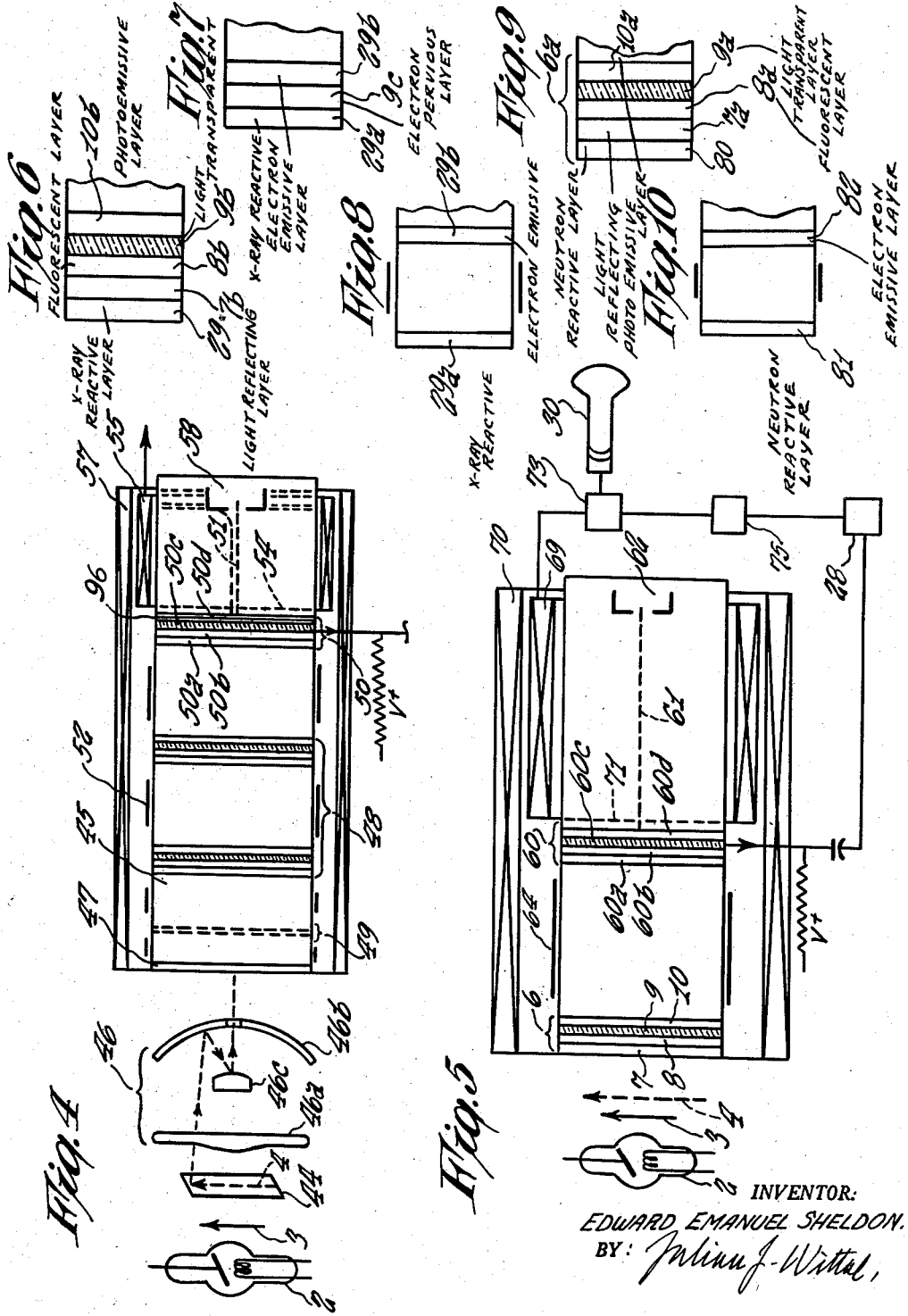

United States Patent Office 2,894,159
Patented July 7, 1959

2,894,159

ELECTRONIC SYSTEM FOR X-RAY IMAGES

Edward Emanuel Sheldon, New York, N.Y.

Application June 1, 1951, Serial No. 229,496

6 Claims. (Cl. 313—65)

This invention relates to a method and system for intensifying and storing images of invisible radiations and refers more particularly to a method and device for intensifying and storing X-ray images, and also for images formed by irradiation by beams of atom particles such as electrons or neutrons, and represents a continuation in part of my co-pending application, Ser. No. 13,916, filed March 9, 1948 which is now U.S. Patent No. 2,555,424, issued June 5, 1951, and also has subject matter common with my U.S. Patent No. 2,603,757.

One objective of this invention is to provide a method and system to produce intensified images for examination. The intensification will make it possible to overcome the inefficiency of the present fluoroscopic examination. At present illumination of the X-ray fluoroscopic image is of the order of 0.001–0.01 milli-lambert. At this level the human eye has to rely exclusively on scotopic (dark adaptation) vision which is characterized by tremendous loss of normal visual acuity in reference both to the detail and contrast.

Another objective of this invention is to make it possible to prolong the fluoroscopic examination, since it will be possible to reduce markedly the strength of radiation affecting the patient's body. Conversely, the exposure time or energy necessary for examination using an invisible radiation may be considerably reduced.

Another objective of this invention is to provide a method and device to produce sharper and more contrasting images of invisible radiations than it was possible until now.

Another purpose of this invention is to provide the possibility of storing the invisible images and inspecting them for a desired length of time when wanted without further expenditure of invisible radiation.

The present intensifying devices concerned with reproduction of X-ray fluoroscopic images were completely unsatisfactory, as in order to obtain improvement in the visual acuity intensification of the brightness of the order of 1000 is obligatory. Without intensification of luminosity of at least of the order of 500–1000 the eye is confined to so-called scotopic vision at which it is not able to perceive definition and contrast of the fluoroscopic image. It is well known that intensification of the brightness of the X-ray fluoroscopic image cannot be achieved by increase of energy of the X-ray radiation, as it will result in damage to the patient's tissues. Therefore, to obtain the objectives of this invention, a special X-ray sensitive pick-up tube had to be designed. This novel X-ray pick-up tube is characterized by elimination of the optical system which resulted in 20–30 fold gain in the light reaching the photocathode. This gain of incident light on photocathode allowed to activate the transmitting system, which before was not possible as with the amount of incident light available after passage through the focusing optical system, the signal to noise ratio was too low for satisfactory results.

To accomplish the objectives of this invention, a composite X-ray sensitive photocathode consisting of an extremely thin photoemissive layer, a transparent layer and an X-ray fluorescent or reactive layer, is positioned within an novel X-ray sensitive television pick-up tube. This combination represents a basic improvement, as it results in 20–30 fold gain in light reaching the photoemissive layer. The importance of this construction is clear when it is considered that the most sensitive television pick-up tube has a threshold of operation at above 0.01 milli-lambert which cannot be provided by the energy of X-ray beam compatible with the patient's safety. It is, therefore, obvious that the elimination of the optical system disposed between the fluorescent screen and television system represents an important improvement in securing the necessary amount of light for operation of the X-ray pick-up tube. Still better results were obtained by the use of a very thin light reflecting layer, such as for aluminum deposited on the surface of the fluorescent layer of the composite screen, nearest the source of radiation in order to increase the transfer of light to the photoemissive layer. It is also very important to interpose between the fluorescent and photoemissive layers a very thin light transparent, chemically inactive separating layer, in order to prevent detrimental chemical interaction of said layers.

The signal to noise ratio deciding the sharpness and contrast of the image was further improved by the use of a series of composite screens each consisting of an electron transparent light reflecting layer, electron fluorescent layer, chemically inactive light transparent layer, and of photoemissive layer, which screens are disposed within the X-ray pick-up tube in succeeding stages. The X-ray image is converted in said photocathode composite into photoelectron image. The photoelectron image is accelerated and focused by the electrical fields on the electron sensitive composite screen, whereby an intensified photoelectron image is produced, which again may be focused on the next electron sensitive composite screen, producing further intensification of image.

Further intensification of the X-ray image was obtained by the use of one or plural electron multipliers disposed between the composite X-ray sensitive photocathode described above and the scanning target of the X-ray sensitive pick-up tube. The photoelectron image, having the pattern of the X-ray image, emitted by the composite X-ray sensitive photocathode, is accelerated and focused by the electric or magnetic fields on the secondary electronemissive electrode, whereby an intensified electron image is produced.

In some instances, it is advantageous to demagnify the electron image emitted by the first composite X-ray sensitive screen before projecting it on the next composite screen or on the electron multiplier electrode. The electron diminution of the image results in its intensification proportional to the linear decrease of its size. Next, the intensified photoelectron image is stored in the target of the X-ray sensitive pick-up tube, for a predetermined period of time, then is scanned by electron beam and converted into video signals. Video signals are sent to amplifiers. By the use of variable mu amplifiers in one or two stages, intensification of video signals can be produced in non-linear manner, so that small differences in intensity of succeeding video signals can be increased one to ten times, producing thereby a corresponding gain of the contrast of the final visible image in receivers, which was one of the objectives of this invention.

In some cases video signals are sent to the storage tube having a storage target and are deposited there by modulation of the electron scanning beam of said storage tube. The stored electrical charges, having the pattern of X-ray images, are released from the storage target after predetermined time by scanning it with another electric beam or by flooding it with light. The released electron image is converted again into video signals and sent to final receivers to produce visible image with desired intensification.

The invention will appear more clearly from the following detailed description when taken in connection with the accompanying drawings by way of example only preferred embodiments of the inventive idea.

In the drawings:

Figure 1 shows a sectional diagrammatic view of a system for intensifying images of invisible radiations;

Figure 2 shows an improved modification of said system having electron multipliers and a storage tube;

Figure 3 represents a simplified modification of said system;

Figure 4 represents a modification of said system using optical means therein;

Figure 5 represents a modification of said system having a storage target;

Figure 6 is a sectional view of the front portion of the X-ray pick-up tube showing an alternate form of the X-ray pick-up tube;

Figure 7 is a sectional view of the front portion of the X-ray pick-up tube showing a modification of the X-ray pick-up tube;

Figure 8 is a sectional view of the front portion of the X-ray pick-up tube showing a modification of the X-ray pick-up tube;

Figure 9 represents a sectional view of the front portion of neutron sensitive pick-up tube;

Figure 10 represents a modification of the front portion of neutron sensitive pick-up tube.

Reference will now be made to Figure 1, which illustrates new X-ray sensitive pick-up tube 1 to accomplish the purposes of the invention as outlined above. The X-rays 2 produce invisible X-ray image 4 of the examined body 3. The invisible X-ray image 4 penetrates through the face 5 of the X-ray sensitive pick-up tube and activates the composite screen 6 acting as a photocathode, which consists of a very thin X-ray transparent light reflecting layer 7, such as e.g. of aluminum, of X-ray fluorescent layer 8 with powdered glass, of chemically inactive light transparent barrier layer 9, and of photoemissive layer 10. The face 5 of the tube is of material transparent to radiation used for examination.

The fluorescent layer 8 and the photoemissive layer 10 should be correlated, so that under the influence of the particular radiation used, there is obtained a maximum photoemissive effect. More particularly, the fluorescent layer should be of a material having its greatest sensitivity to the type of radiation to be used and the photoemissive material likewise should have its maximum sensitivity to the wave length emitted by the fluorescent layer. Fluorescent substances that may be used are: zinc silicates, zinc selenides, zinc sulphide, calcium tungstate or $BaPbSO_4$ with or without activators. The satisfactory photoemissive material will be caesium oxide activated by silver, or caesium, potassium or lithium with antimony or bismuth. An extremely thin light transparent chemically inactive barrier layer 9 should separate the fluorescent 8 and photoemissive 10 layers. The separating layer 9 can be an exceedingly thin, transparent to light, film of mica, glass, silica, $ZnF_2$, metal or of a suitable plastic or of a conducting material known as "Nesa." The X-ray image is converted in the fluorescent layer 8 of the composite photocathode 6 into fluorescent image and then in the photoemissive layer 10 into a photoelectron image. The photoelectron image, having the pattern of the X-ray image, is accelerated by electric fields 22 and is focused by means of magnetic or electrostatic fields 22a on the first composite screen 17 of the image amplifying section 12 of the tube. The amplifying section 12 has one or a few successively arranged composite screens, each of them consisting of an electron pervious light reflecting layer 13, of layer fluorescing 14 when irradiated by electrons, of chemically inactive barrier layer 15 transparent to fluorescent light and of photoemissive layer 16. Fluorescent substances which may be used for said composite screen are zinc silicates, zinc selenides, zinc sulphides, calcium tungstate or $BaPbSO_4$, with or without additional activators; also organic phosphors, such as anthracene or naphthalene are suitable. The satisfactory photoemissive materials are caesium oxide activated by silver, or caesium with antimony or with bismuth, or antimony with lithium or potassium. The barrier layer 15 between the fluorescent and the photoemissive surfaces can be very thin light transparent layer of mica, glass, $ZnF_2$, of silica, metal or of a suitable plastic. The electron pervious light reflecting layer 13 may be of aluminum or of silver. The photoelectron image from the photocathode 6 focused on the composite screen 17 causes fluorescence of its fluorescent layer 14, which activates the photoemissive layer 16, producing an intensified photoelectron image, having the pattern of the original X-ray image. The intensified photoelectron image can be again focused on the next composite screen, whereby its further intensification may be achieved.

In some applications, it may be preferable to use separately or in conjunction with the amplifying section 12, the electron multiplier section 18 consisting of one or few stages of secondary electron multipliers 19, which serves to intensify further the electron image.

In such a case, the photoelectron image from the composite photocathode 6, after acceleration is focused by means of electrostatic or magnetic fields 22a on the multiplier. This results in intensification of the electron image by secondary emission from the first stage 19 of the multiplier section. The secondary electrons emitted from the first stage and having the pattern of the X-ray image may be focused after acceleration on the second stage of the multiplier section, producing thereby further intensification of the electron image. The electron image, produced by electron multiplier section of the tube is projected on the first composite screen 17 of amplifying section of the tube for its further intensification. The electron image produced by the amplifying section of the tube is focused on the composite target 21 producing therein pattern of electrical charges corresponding to the X-ray image.

In some instances, it is advantageous to demagnify the photoelectron image emitted by the composite photocathode 6 before projecting it on the composite screen 17. The electron diminution of the image is accomplished by means of electrostatic or magnetic fields which are well known in the art and, therefore, are omitted in order not to complicate the drawings.

The composite storage target 21 consists of an electron pervious, light reflecting and therefore light impervious layer 21a, of a layer 21b fluorescing when irradiated by electrons, of chemically inactive layer 21c, which is electrically conductive and transparent to light and of photoconductive layer, 21d. Fluorescent substances, which may be used for the composite screen, are zinc silicates, zinc selenides, zinc sulphide, calcium tungstate or $BaPbSO_4$, with or without additional activators. The satisfactory photoconductive materials are selenium, $Cu_2O$, germanium, thallium sulphide and lead sulphide or selenide. Many sulphides, selenides and oxides exhibit strong photoconduction and can be used for this purpose. The layer 21c between the fluorescent and photoconductive surfaces serves as a separating barrier and as a signal plate. It can be made of a very thin light transparent layer of a conductive metal or of any other transparent and conductive material; material known in trade under name of "Nesa," is very suitable for this purpose.

The electron pervious light reflecting layer 21a may be of aluminum or of silver. The electron current image from the intensifying screen is focused on the composite target 21 and causes fluorescence of its fluorescent layer 21b which in turn produces changes in conductivity in the layer 21d according to the pattern of the original X-ray image. The storage target 21 is scanned by electron beam 23 from the electron gun 25. The electron gun is well known in the art and therefore does not need any further description. The scanning electron beam may be of a high velocity such as applied in the iconoscope or of a low velocity.

A low velocity scanning beam is used in the embodiment of the invention shown in Fig. 1 and it is controlled by the deflection yoke 66. The scanning beam striking the photoconductive layer 21 deposits electrons thereon and charges it to the potential of the cathode of the electron gun. The signal plate layer 21c is charged positively from an extraneous source of electrical power. The resistance of the photoconductive layer is great enough to prevent passage of charges from its scanned side to the positive signal plate. If however the photoconductive layer is illuminated, its resistance decreases proportionally to the intensity of the incident light and the time of illumination. This makes possible the flow of charges through the photoconductive layer and the scanned side of said layer becomes between successive scans 1–2 volts positive in relation to the potential of the cathode of the electron gun. During the next scan the electron beam neutralizes this positive charge on the photoconductive layer and produces thereby a video signal which flows through the signal plate layer 21c to the amplifiers 28. The amplified video signals are sent by coaxial cable or by high frequency waves to the receiver of kinescope type 30 or facsimile type in which they are reconverted into visible images. In a close proximity to the scanned side of the photoconductive layer is disposed a mesh screen 65, which serves to provide a uniform field, in front of the target 21.

In the improved form of this invention shown in Fig. 2, the composite target 21 in the X-ray pick-up tube 41 is scanned by a slow electron beam 23a from the electron gun 25a. The scanning electron beam is controlled by the deflection yoke 67 and focusing coil 22b. The scanning beam is modulated by the pattern of positive electrical charges on the photoconductive layer 21d. After neutralization of said charges, the returning beam 24 carries video information. The returning electron beam strikes the first stage of the electron multiplier 26. The secondary electrons from the first stage of the multiplier strike the succeeding stage 27 around and in the back of the first stage. This process is repeated in a few stages resulting in a marked multiplication of the original electron signals. The signal currents from the last stage of the multiplier are fed into television amplifiers and then sent by coaxial cable or by high frequency waves to the receivers of kinescope type 30 or facsimile type in which they are reconverted into visible images for inspection or for recording. The remaining parts of this pick-up tube 41 are the same as described above in Figure 1.

In order to obtain amplification of contrast of the X-ray image, the amplifiers 28 are provided with variable mu tubes in one or two stages. Small differences in intensity of the succeeding video signals are increased by variable mu tubes in non-linear manner resulting in a gain of the contrast of the visible image in receivers.

A marked improvement of the performance of the X-ray intensifying system is obtained by the use of a storage tube in said system. Video signals from the X-ray sensitive pick-up tube are transmitted to the storage tube and are stored therein. This arrangement allows shutting off the X-ray radiation while reading the X-ray image and results in a marked saving of X-ray exposure. Figure 2 illustrates this novel system.

Video signals are sent from the pick-up tube 41 to the storage tube 85 and are deposited there in the form of electric charges, by means of modulating the scanning electron beam 86 of said storage tube, in a special target 87 in which they can be stored for a predetermined time.

The storage target 87 consists of a thin perforated sheet of metal or other conducting material, or of a woven conducting wire mesh 87a. On the side of the target facing the electron gun there is deposited by evaporation storage material 87b in such a manner that openings in the target should not be occluded. In some cases on the side of the target facing the electron gun there is deposited by evaporation a thin metal coating. The scanning electron beam 86 is produced in the storage tube 85 by the electron gun 88 and is modulated by incoming video signals from the X-ray pick-up tube 41. The scanning electron beam may be focused and deflected to produce television-like raster by magnetic or electrostatic means which are well known in the art. This scanning electron beam should have the finest spot compatible with the required intensity of beam. Between the electron gun and the storage in a close spacing to the target, there is mounted a fine mesh conducting screen 90. On the opposite side of the storage target there is disposed a metal electrode 89, which acts as a collector of the electrons during the reading phase.

The electrons of the scanning beam strike the storage target 87 and deposit thereon varying charges at successive points according to the amplitude of modulating input signals from the X-ray pick-up tube. The best way of operating my system is to have the storage surface at zero potential or at cathode potential and then to write on it positive; it means to deposit positive charges. This can be accomplished by adjusting the potential of the surface of the storage target, so that its secondary emission is greater than unity. The secondary electrons will be collected by the conducting mesh 87a of the storage target or by a collecting electrode and positive charges will be left on the storage surface. These positive charges deposited on the storing surface of the target may be stored thereon for many hours depending on the type of the storage material 87b which was used. Whereas $BaF_2$ has a time constant of 0.1 second, $CaF_2$ has the time constant of 50 hours.

In the reading phase, the scanning beam is decelerated between the screen 90 and the target 87. Then it passes through the openings in the target 87. The electrode 89, during reading, is kept at the potential positive in relation to the electron gun cathode. Therefore, the electrons of the scanning beam pass through openings in the target 87, and are drawn towards electrode 89.

The passage of the scanning electron beam is modulated by the pattern of deposited charges on the storage target. The greater is the positive charge, the more electrons will pass through the openings in the target. The less positive is the stored charge, the fewer electrons will be transmitted through these openings. In this way, the electron beam 86 scanning the storage target in the usual television raster will be modulated by the stored image. The transmitted electrons will be collected by the collector 89 and will be converted over suitable resistor into video signals. The transmitted electrons may be also multiplied by using, instead of collector 89, an apertured electrode and deflecting fields to make said electrons pass through said aperture 89a in succession and to be fed into multiplier 27a before converting them into video signals.

Video signals having the pattern of the original X-ray image, are amplified and transmitted by coaxial cable or by high frequency waves to receivers. Receivers may be of various types such as kinescopes, facsimile receivers; electro-graphic cameras and others may be used to reproduce images for inspection or of recording.

After the stored image has been read and no further storage is desired, it may be erased by the use of the scanning electron beam 86 by adjusting the potential of the storage target to the value at which the secondary electron emission of its storing surface is below unity. In such a case, the target will charge negatively to the potential of the electron gun cathode. The potential of the reflector 89 in the erasing phase of operation must be more negative than of the storage target, so that the scanning electron beam will be repelled to the storage target and will neutralize the stored positive charges.

A simplified form of this invention is shown in Figure 3. In this embodiment of this invention, the X-rays 2 produce invisible X-ray image 4 of the examined body 3. The invisible X-ray image 4 penetrates through the face 5 of the X-ray sensitive pick-up tube 42 and activates the composite screen 31 in the X-ray pick-up tube acting as a photocathode. The screen 31 consists of a very thin X-ray transparent light reflecting layer 31a, such as of aluminum, of Xray fluorescent layer 31b, of chemically inactive light transparent barrier layer 31c, which is electrically conductive, and of photoconductive layer 31d. The face 5 of the tube is of material transparent to radiation and for examination.

The fluorescent layer 31b is the same as described above. The light transparent conducting layer 31c may be of metal. The photoconductive layer 31d may be of selenium, $Cu_2O$, germanium, thallium sulphide, lead sulphide or selenide. The X-ray image is focused on the composite photocathode 31 and causes fluorescence of its fluorescent layer 31b, which in turn produces changes in conductivity in the layer 31d, according to the pattern of the original X-ray image. The photocathode 31 is scanned by the electron beam 23b from the electron gun 25b.

The scanning electron beam may be of a high velocity, such as in the iconoscope or of the low velocity. A low velocity scanning beam is used in the embodiment of the invention shown in Figure 3 and is controlled by the deflection yoke 68 and focusing coil 22c. The scanning beam, striking the photoconductive layer 31d, deposits electrons thereon and charges it to the potential of the cathode of the electron gun. The signal plate layer 31c is charged positively from an extraneous source of electrical power.

The resistance of the photoconductive layer is great enough to prevent passage of charges from its scanned side to the positive signal plate. If, however, the photoconductive layer is illuminated, its resistance decreases proportionally to the intensity of the incident light and the time of illumination. This makes possible the flow of charges through the photoconductive layer and the scanned side of said layer becomes between successive scans 1-2 volts positive in relation to the potential of the cathode of the electron gun. During the next scan, the electron beam neutralizes the positive charge on the photoconductive layer and produces thereby a video signal, which flows through the signal plate layer 31c to the amplifiers. The amplified video signals are sent by coaxial cable or by high frequency wave to the receivers of kinescope type 30 or facsimile type, in which they are reconverted into visible images. In a close proximity to the scanned side of the photoconductive layer, is disposed a mesh screen 65b, which serves to provide a uniform field, in front of the target 31.

It is understood that, instead of a composite photocathode described above (Figure 1), an X-ray reactive layer of electron emissive type may be used as a photocathode. Lead, gold or uranium are suitable for this purpose. In such case, the electron image from the X-ray reactive layer 29 is focused on the amplifying screen 17 by means of magnetic or electrostatic fields.

An alternative of this invention (see Figure 6) is based on the use of a composite photocathode, in the X-ray pick-up tube 1, having an X-ray reactive layer of electron emitting type 29, such as e.g. lead or bismuth, between the face of the tube and light reflecting layer 7b, so that electrons liberated by X-ray radiation from the X-ray reactive layer will excite the adjacent fluorescent layer 8b, whose fluorescence will, in turn, activate the adjacent suitable photoemissive layer 10b through light transparent barrier layer 9b. In another form of this invention (see Figure 7), the X-ray reactive layer 29a of the composite photocathode is in close apposition to the secondary electron emissive layer 29b, such as e.g. of Ag or Mg, both layers separated from each other only by very thin electron pervious chemically inactive barrier layer 9c. In some instances, it is preferable to eliminate the barrier layer (see Figure 8) and to focus electron image from the X-ray reactive layer 29a on the electron emissive layer 29b by means of magnetic or electrostatic fields.

In another alternative of this invention (Figure 4) the X-ray image is converted into a visible fluorescent image in the fluorescent screen 44 positioned outside of the X-ray pick-up tube 45 and is projected by the optical system 46 onto photocathode 47 of the X-ray pick-up tube 45. As explained above, the loss of light caused by the use of the optical system makes it impossible to activate the most sensitive television pick-up tube by the X-ray fluorescent image of the human body. By the use of the reflective optical system, there is obtained 5 to 8 fold gain in light reaching the photocathode of the pick-up tube from the fluorescent screen 44. This gain, being still not sufficient to activate the standard television pick-up tube, a novel pick-up tube was designed. The novel pick-up tube 45 is characterized by the amplifying section 48, consisting of a single or plural composite screen and of electron multiplying section 49, which both were described in detail above. The X-ray fluorescent image is projected by the reflective optical system 46, which in this particular case, consists of an aspherical correction plate 46a, of a spherical concave mirror 46b with an aperture, and of auxiliary plane or convex spherical mirror 46c, onto photocathode 47 to be converted there into photoelectron image.

It is to be understood that many various forms of the optical system, such as Maksutov's Schmidt's or an optical system using a meniscus lens, may be used for this purpose and they all come within the scope of this invention.

The photoelectron image, after multiplication in the multiplier section 49, and after intensification in the amplifying section 48 of the pick-up tube, is accelerated by means of electric fields 52 and is focused by means of magnetic or electrostatic fields 57 on the composite target or screen 50, consisting of a light reflecting layer 50a, a fluorescent layer 50b, light transparent conducting layer 50c and photoconducting layer 50d. The target is scanned by electron beam 51, which produces video signals, as was explained above and illustrated in Figures 1 and 2. The electron beam 51 is controlled by deflection yoke 55. Video signals are fed into amplifier system 28 and therefrom to the immediate or remote receivers to produce visible image with desired luminosity and gain in contrast. Mesh screen 54 provides uniform field in front of the target.

The storage of X-ray images, which was another purpose of this invention, may be obtained by means of any of the novel X-ray pick-up tubes, shown in Figures 1, 2, 3 and 4. Normally, in the pick-up tube, efforts are made to insure that picture signals are completely erased each scanning cycle, if the fuzzing of moving objects is to be avoided. However, this defect for conventional television, is exactly what is necessary for storage of X-ray images. My storage tube shows this time lag, as a result of a very high target capacity in combination with a low velocity and intensity scanning beam. These are the conditions, which cause a long time constant for discharge of a condenser. The composite storage targets are condensers charged positively by the photoconduction and discharged by the scanning beam current. The target potential builds up proportionately to the time of light exposure. The slope of the target charging curve is determined by the capacity of the target and by the photoconduction. Therefore, the only modifications necessary, in order to use the X-ray pick-up tube 1, 41, 42 or 45 for the storage of X-ray images, are to increase capacity of their composite targets 21, 31, 50 and 60, in order to allow a storage of large electrical charges and to decrease intensity of their scanning electron beams. The capacity of the composite target may be increased by using a photoconductive layer of a high resistance, such as specially prepared selenium, or by introducing an additional dielectric light transparent layer 96, such as of mica, precipitated silica, or glass, between the photoconducting layer 50d and conducting layer 50c. The change in intensity of the scanning electron beam requires only adjustment of the electron gun.

The preferred embodiment of a system for intensifying and storing of X-ray images is shown in Figure 5. The composite photocathode 6 may be the same as shown in Figure 1. An electron image, having the pattern of of the X-ray image, is produced by said photocathode, then is accelerated by electric fields 64 and is focused by the magnetic or electrostatic fields 70 on the composite storage target 60.

The storage target 60 consists of a light reflecting layer 60a, fluorescent layer 60b, light transparent conductive layer 60c and a photoconductive layer 60d. The latter layer, in order to have a good storage for charge images, must have a big resistance and must have a minimum thickness compatible with the sharpness of images. Specially prepared for this purpose, ZnS, CdS, CdSe or selenium are suitable for this purpose. The electron gun 62 is designed to produce the scanning electron beam of the lowest intensity compatible with generation of video signals of adequate signal to noise ratio. The electron image from the photocathode 6 is converted in the composite storage target 60 in a stored charge image. The scanning electron beam 61 is controlled by the deflection yoke 69. When striking the photoconductive layer 60d, it produces video signals, as was explained above. These video signals have the pattern of the original X-ray image and may be reproduced in receivers, in a visible form for reading. The dissipation of the stored charge image by the action of the scanning electron beam in this construction is a slow process and the image may be read for a few minutes.

The action of the deflecting circuits and of electron gun 62 is of intermittent character. At the time of the X-ray exposure, they are inactive. When the stored X-ray image is to be read, they are activated, so that the electron beam 61 can scan the photoconductive layer 60d.

After the examination of the X-ray image has been concluded, the composite storage target 60 has to be restored to its original condition, before the next X-ray image can be stored. The photoconductive layer 60d at the end of the reading, has remaining positive charges thereon. In order to neutralize these charges, I spray it with the electron beam from the gun 62 with velocity, at which secondary electron emission ratio of the photoconductive layer is below unity. In this way, the storage target can be immediately restored to the original condition.

Storage of X-ray images may also be accomplished by using a light feed-back system, as shown in Fig. 1. The fluorescent image in this modification of my invention is reproduced on the face of the kinescope 30a as was explained above, is projected on a television pick-up tube 92 and produces a photoelectron image therein. The photoelectron image is converted by the pick-up tube into video signals in the manner well known in television. For the purposes of this invention, any type of television pick-up tube, such as of photoemissive type, photoconductive type, or of photovoltaic type may be used. Video signals are sent from the pick-up tube to the kinescope 30a again and reproduce there again the fluorescent image 31. The fluorescent image again is projected on the pick-up tube to produce again photoelectron image. In this way, an endless stream of fluorescent light images is produced, so that the fluorescent image may be inspected for a desired time without maintaining the X-ray exposure. Instead of projecting the fluorescent image from the kinescope on a television pick-up tube 92, the fluorescent image may also be projected on the photoemissive layer of the X-ray sensitive pick-up tube 1 described above, because during the reading of the image, the X-ray beam is not operating and the X-ray pick-up tube is, therefore, free to be used for regeneration of the examined image.

It is not intended to restrict the scope of this invention to the use of X-ray or gamma rays, but other corpuscular radiation, such as protons or neutrons and suitable reactive layers, should be comprehended. This form of the invention is illustrated in Figure 9, wherein a neutron reactive layer 80, preferably from the group boron, lithium, gadolinium, uranium or paraffine is placed within the image tube to act as the neutron sensitive layer of the composite photocathode 6a. The protons or electrons liberated from the layer 80 under the impact of neutron radiation will strike through a thin electron pervious chemically inactive, light reflecting layer 7a, a suitable fluorescent layer 8a, causing it to fluoresce and activate a suitable photoemissive layer 10a through the light transparent barrier layer 9a. In other cases, a neutron reactive layer of cadmium or copper will be more advantageous, because of gamma emission, which will cause fluorescence of the fluorescent layer.

In some cases, it may be more desirable to eliminate the fluorescent layer and to cause protons or electrons from the neutron reactive layer 81 to act on adjacent electron emissive layer 82, such as of beryllium, magnesium or silver, in which case, electron pervious chemically inactive barrier layer may be used to prevent chemical interaction of said adjacent layers. In other cases, better results are achieved by focusing said protons or electrons from the neutron reactive layer 81 on an electron emissive layer 82 with magnetic or electrostatic fields (see Figure 10).

While I have shown a preferred embodiment of my invention, it is to be understood that changes and variations may be resorted to in the elements, combination and construction of my invention, and I reserve my rights to such changes and variations as are within the spirit of this specification, and the scope of the claims hereunto appended.

I claim:

1. A vacuum tube having in combination a screen for receiving an image and converting said image into a current of electrons and a composite target for receiving said electrons, said target comprising luminescent means, a light transparent layer of conducting material and a photoconductive layer having an exposed surface.

2. A vacuum tube having in combination means for receiving an image and converting said image into a current of electrons and a composite target comprising a light reflecting layer, luminescent means adjacent to said light reflecting layer, light transparent dielectric means, light transparent conducting means and a photoconductive layer.

3. A vacuum tube having in combination a composite screen comprising luminescent means and photoelectric means for receiving an image and converting said image into a current of electrons, and a target comprising a photoconductive layer for receiving said beam of electrons and producing in response to said beam changes of electrical conductivity having the pattern of said electron beam.

4. A vacuum tube having in combination a composite screen comprising luminescent means, and photoelectric means for converting an image into a current of electrons, and a composite target comprising luminescent means, light transparent dielectric means, light transparent conducting means and a photoconductive layer.

5. A vacuum tube having in combination a screen for receiving an image and converting said image into a current of electrons, a composite target for receiving said current of electrons, said target comprising luminescent means, light transparent conducting means and a photoconductive layer having one surface exposed, and means for irradiating said exposed surface of said photoconductive layer with an electron beam.

6. A vacuum tube having in combination a screen for converting an image into a current of electrons, a composite target for receiving said current of electrons and converting said current into changes of electrical conductivity, said composite target comprising a luminescent means, light transparent dielectric means, a light transparent conducting layer and a photoconductive layer, and means for irradiating said composite target with an electron beam.

References Cited in the file of this patent

UNITED STATES PATENTS

| | | |
|---|---|---|
| Re. 23,802 | Sheldon | Mar. 16, 1954 |
| 2,175,888 | Flory | Oct. 10, 1939 |
| 2,219,113 | Ploke | Oct. 22, 1940 |
| 2,258,294 | Lubsznski et al. | Oct. 7, 1941 |
| 2,344,042 | Kallmann et al. | Mar. 14, 1944 |
| 2,433,941 | Weimer | Jan. 6, 1948 |
| 2,555,424 | Sheldon | June 5, 1951 |
| 2,690,516 | Sheldon | Sept. 28, 1954 |